United States Patent
Nunns (10) Patent No.: US 7,024,554 B1
(45) Date of Patent: Apr. 4, 2006

(54) SYSTEMS AND METHODS THAT AUTHORIZE TARGET DEVICES UTILIZING PROPRIETARY SOFTWARE AND/OR HARDWARE

(75) Inventor: Andrew Edward Nunns, Naperville, IL (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1047 days.

(21) Appl. No.: 09/676,748

(22) Filed: Sep. 29, 2000

(51) Int. Cl.
H04L 9/00 (2006.01)
H04K 1/00 (2006.01)
G06F 17/60 (2006.01)

(52) U.S. Cl. .................. 713/164; 713/191; 713/192; 726/4; 726/26; 380/2; 380/201; 705/51; 705/56; 705/71

(58) Field of Classification Search ........... 713/187, 713/400, 503, 164; 380/237
See application file for complete search history.

(56) References Cited

U.S. PATENT DOCUMENTS

| | | | | |
|---|---|---|---|---|
| 4,888,798 A * | 12/1989 | Earnest | .................. | 705/54 |
| 5,267,312 A * | 11/1993 | Thompson et al. | ......... | 380/237 |
| 5,457,408 A | 10/1995 | Leung | ................. | 326/38 |
| 5,579,479 A | 11/1996 | Plum | ................. | 395/188.01 |
| 5,652,793 A * | 7/1997 | Priem et al. | .............. | 705/56 |
| 5,724,425 A * | 3/1998 | Chang et al. | ............. | 705/52 |
| 5,892,683 A * | 4/1999 | Sung | .................. | 703/27 |
| 6,609,201 B1 * | 8/2003 | Folmsbee | ............... | 713/187 |
| 6,651,181 B1 * | 11/2003 | Lacey | ................. | 713/503 |

* cited by examiner

Primary Examiner—Gilberto Barrón, Jr.
Assistant Examiner—A. Nobahar
(74) Attorney, Agent, or Firm—Myers Bigel Sibley & Sajovec PA (57) ABSTRACT

An integrated system comprises an authorization device that generates a second encrypted data stream in response to a first data stream, and a programmable logic device (PLD) that generates a third encrypted data stream in response to the first data stream, while simultaneously operating under at least partial control of program code during a first time interval This third encrypted data stream is preferably generated internal to the programmable logic device. Authorization detection circuitry is also preferably provided that compares the second and third encrypted data streams at least periodically during the first time interval. This circuitry may also disable operation of the programmable logic device if the second and third encrypted data streams indicate that the programmable gate array is not authorized to use the program code. The authorization detection circuitry is preferably provided within the programmable logic device and may utilize at least a portion of the proprietary program code (e.g., "deadman" code) to perform its operations. Disabling operation of the programmable logic device may constitute a complete shut down of the programmable logic device or the performance of the programmable logic device may be degraded sufficiently to render it unacceptable in the desired application.

39 Claims, 4 Drawing Sheets

SYSTEMS AND METHODS THAT AUTHORIZE TARGET DEVICES UTILIZING PROPRIETARY SOFTWARE AND/OR HARDWARE

FIELD OF THE INVENTION

The present invention relates to integrated systems and methods of operating same, and more particularly, to integrated systems requiring authorization to utilize proprietary software and/or hardware.

BACKGROUND OF THE INVENTION

Figure 1:
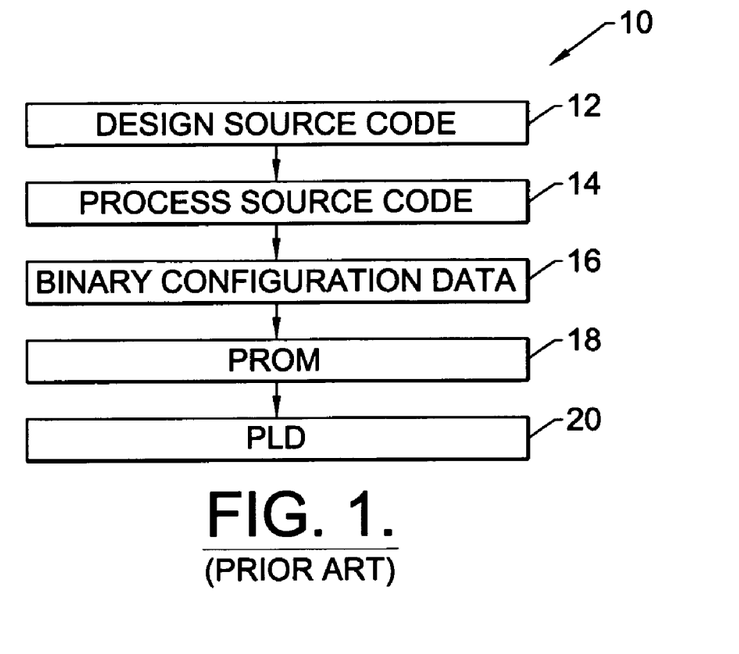
FIG. 1 is a flow diagram of conventional operations used to load configuration data into programmable logic devices.

Programmable logic devices (PLDs), such as field programmable gate arrays (FPGAs), typically utilize binary configuration data when performing desired operations in a target application. Frequently, an end user of a programmable logic device would acquire proprietary configuration data ("software") from a software developer by executing a software license agreement. Pursuant to this agreement, an end user would typically receive either design source code or more often the binary configuration data compiled from the source code. As illustrated by the conventional operations 10 of FIG. 1, proprietary design source code of a developer, Block 12, is typically provided to an end user by compiling or processing the source code into binary configuration data, Blocks 14, 16. An end user of a PLD would typically then download the configuration data into a programmable read only memory (PROM) mounted on a printed circuit board, Block 18. The configuration data in this memory could then be accessed and loaded into a PLD during start-up operations, Block 20, so that the PLD becomes configured by the configuration data.

Unfortunately, these operations may put the software developer at risk that unauthorized copies of the binary configuration data might be used in additional target applications for which the software developer does not receive compensation. To address this possibility, software developers may develop complex software license agreements to limit unauthorized copying. Such agreements may be difficult to negotiate and may require large up-front royalty fees. Moreover, such terms may preclude users from entering such licenses when only relatively few applications for the proprietary software are anticipated. Thus, notwithstanding conventional licensing techniques for incorporating proprietary software into programmable logic devices, there continues to be a need for improved techniques that do not suffer from the aforementioned limitations associated with conventional software licensing.

SUMMARY OF THE INVENTION

Preferred integrated systems include devices that authorize programmable logic devices to operate under at least partial control of proprietary software. Each of these "authorization" devices preferably provides continuous or at least periodic authorization to a respective programmable logic device while it is operating in a desired application. This continuous or periodic authorization is preferably provided only so long as the version of software being used by the programmable logic device matches the version of software the authorization device was designed to evaluate and approve.

According to a first preferred embodiment of the present invention, an integrated system comprises an authorization device that generates an encrypted data stream and a programmable logic device (PLD) that also generates an encrypted data stream while simultaneously operating under at least partial control of program code during a first time interval. This program code or software may take the form of data that configures circuitry within the programmable logic device.

Authorization detection circuitry is also preferably provided within the programmable logic device. This circuitry compares the encrypted data streams at least periodically during the first time interval. This circuitry may also disable operation of the programmable logic device if the encrypted data streams indicate that the programmable logic device is not authorized to use the program code. Disabling operation of the programmable logic device may constitute a complete shut down of the programmable logic device or the performance of the programmable logic device may be degraded or impaired sufficiently to render it unacceptable in the desired application.

In particular, the encrypted data streams are evaluated at least periodically during the first time interval to determine whether a "match" is present between the authorization device and the proprietary software used to configure the programmable logic device. A direct ongoing comparison can be made between the encrypted data streams to determine whether there is a sufficiently close identity therebetween while the programmable logic device is operating in a target application. If a sufficiently close identity is present, a "good" flag may be generated within the programmable logic device to enable proper operation for at least some limited time period. An exact identity between the encrypted data streams is preferably not required by the authorization detection circuitry in order to maintain the status of the good flag. However, if a sufficiently close identity is not present between the encrypted data streams over a threshold period of time, then a "fail" flag may be generated. The generation of this fail flag preferably causes the programmable logic device to enter a disabled state. In this disabled state, the programmable logic device may cease to operate or may operate at a degraded or impaired performance level caused by the intentional internal generation of operating errors (e.g., "random" operating errors) by circuitry within the programmable logic device. Other degraded performance states that make the device unfit for the target application may also be possible.

The above-described authorization scheme may also be applied to other forms of programmable logic devices. Some of these programmable logics devices are frequently referred to by the acronyms PLDs, PLAs, PALs, FPLAs, EPLDs, EEPLDs, LCAs, and FPGAs. In addition, the preferred authorization scheme may be applied to application-specific integrated circuits (ASICs) that perform operations which are exclusively or at least partially hardware based. For example, an ASIC may be designed to perform a plurality of functions and operations useful for a variety of applications. Customers purchasing such ASICs may be able to upgrade or expand the functions and operations performed by the ASIC by purchasing one or more authorization devices at the time the ASIC is purchased or thereafter.

Additional embodiments of the present invention include preferred methods of operating programmable logic devices. These methods preferably include the steps of generating the encrypted data streams during a first time interval while simultaneously operating the programmable logic device under at least partial control of program code that may constitute configuration data. These encrypted data streams are preferably evaluated periodically during the first time interval. The operation of the programmable logic device is then disabled during a second time interval if a comparison of the data streams indicate that the programmable logic device is unauthorized to use the program code.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein which are provided as preferred examples. Rather, these embodiments are provided so that this disclosure will be thorough and complete, and will fully convey the scope of the invention to those skilled in the art. Like numbers refer to like elements throughout.

Figure 2:
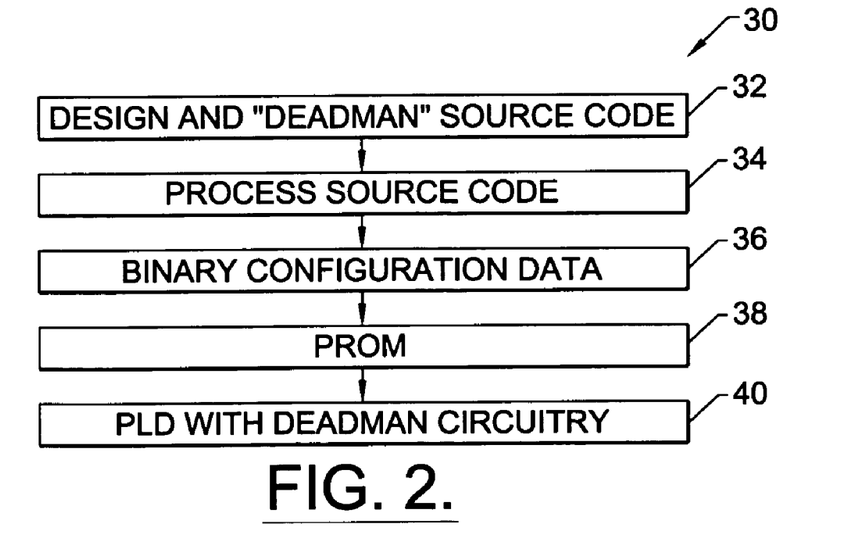
FIG. 2 is a flow diagram of exemplary operations used to load configuration data into programmable logic devices.

Referring now to FIG. 2, exemplary operations 30 for loading a programmable logic device with program code will be described. In particular, FIG. 2 illustrates an operation to generate proprietary design and "deadman" source code, Block 32. As described more fully hereinbelow, this "deadman" source code may augment the design source code so that a programmable logic device performing target operations in accordance with the design code can also be monitored and approved by an authorization device. As illustrated by Blocks 34 and 36, conventional operations may then be performed to process the source code (including "deadman" source code) into binary configuration data. The binary configuration data may then be provided by the source code developer to a PLD manufacturer or end user. According to the present invention, this conveyance can be made without the need to secure a software license agreement between the conveying party and the receiving party. Instead, preferred authorization devices may be sold to authorize each copy of proprietary software being used in a target application. As illustrated by Block 38, the binary configuration data may be loaded into a programmable read-only memory (PROM) or another memory storage device that is mounted on a printed circuit board (PCB) along with a respective PLD. The contents of the PROM may then be accessed and downloaded by the PLD using conventional techniques, Block 40. The downloaded configuration data may operate to configure devices within the PLD that perform operations designed for the target application and configure devices that operate as deadman circuitry. Alternatively, the PLD may acquire the binary configuration data by accessing a network or other device or system external to the PCB.

Figure 3A:
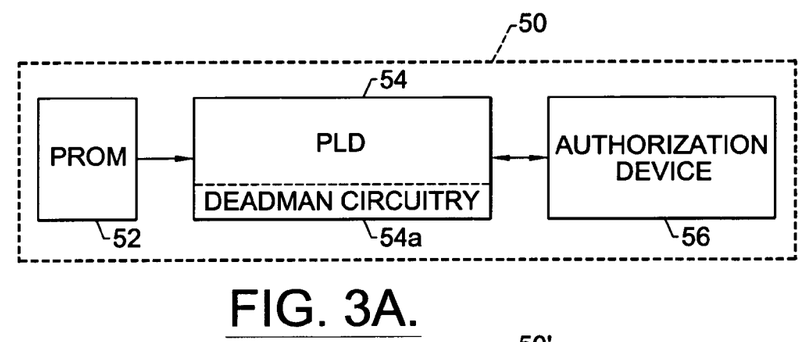
FIG. 3A is a block diagram of a first integrated system comprising a programmable logic device (PLD) and an authorization device according to a first embodiment of the present invention.
Figure 3B:
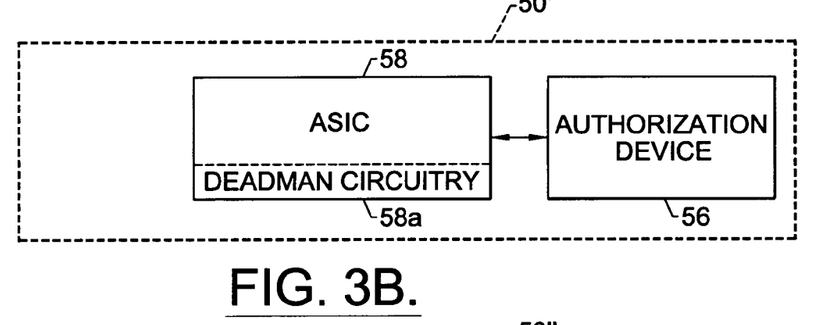
FIG. 3B is a block diagram of a second integrated system comprising an application-specific integrated circuit (ASIC) and an authorization device according to a second embodiment of the present invention.
Figure 3C:
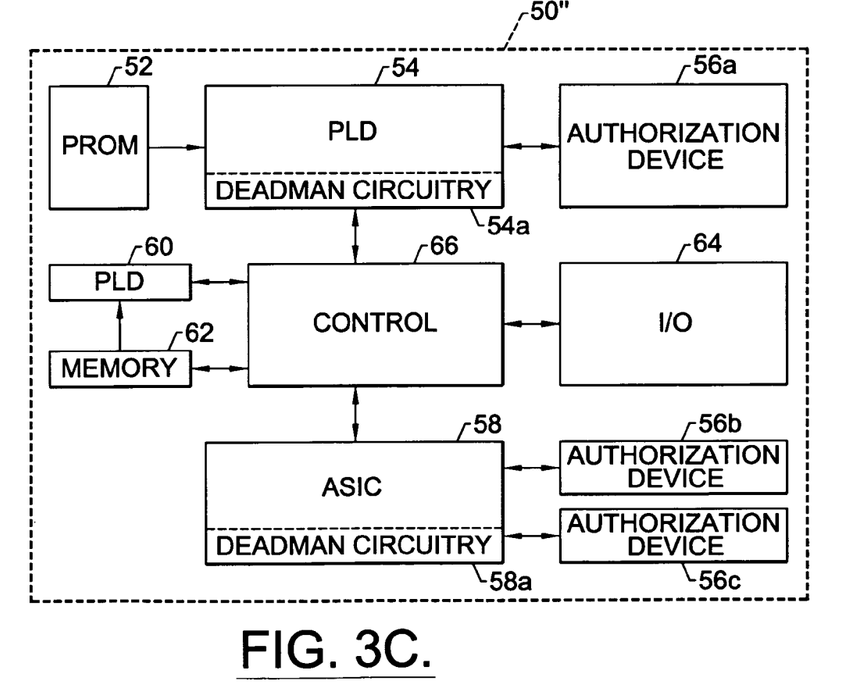
FIG. 3C is a block diagram of a third integrated system comprising PLDs, ASICs and authorization devices according to a third embodiment of the present invention.

Referring now to FIGS. 3A–3C, a plurality of integrated systems according to embodiments of the present invention will be generally described. In particular, FIG. 3A illustrates an integrated system 50 comprising a PROM 52 and a preferred PLD 54 having deadman circuitry 54a therein that becomes programmed by receiving binary configuration data from the PROM 52. The system also includes an authorization device 56 that provides at least periodic authorization to the PLD 54 to operate under control of the loaded binary configuration data. In FIG. 3B, another preferred integrated system 50' is illustrated that comprises an application-specific integrated circuit (ASIC) 58 having deadman circuitry 58a therein and an authorization device 56 that is electrically coupled to the ASIC 58. The deadman circuitry 58a used in ASIC applications typically performs similar operations to the devices within a PLD that are configured as deadman circuitry by the configuration data. In FIG. 3C, an exemplary integrated system 50" is illustrated that comprises a PLD 54 and an ASIC 58 on an printed circuit board. A plurality of authorization devices 56a–56c are also provided. As illustrated, these devices may operate in response to a central controller 66. Additional devices including a PROM 52, a PLD 60 not requiring authorization, a memory array 62 and I/O circuitry 64 may also be provided. Thus, an integrated system may have one or more PLDs or ASICs and respective authorization devices that operate in conjunction with conventional hardware.

Figure 4A:
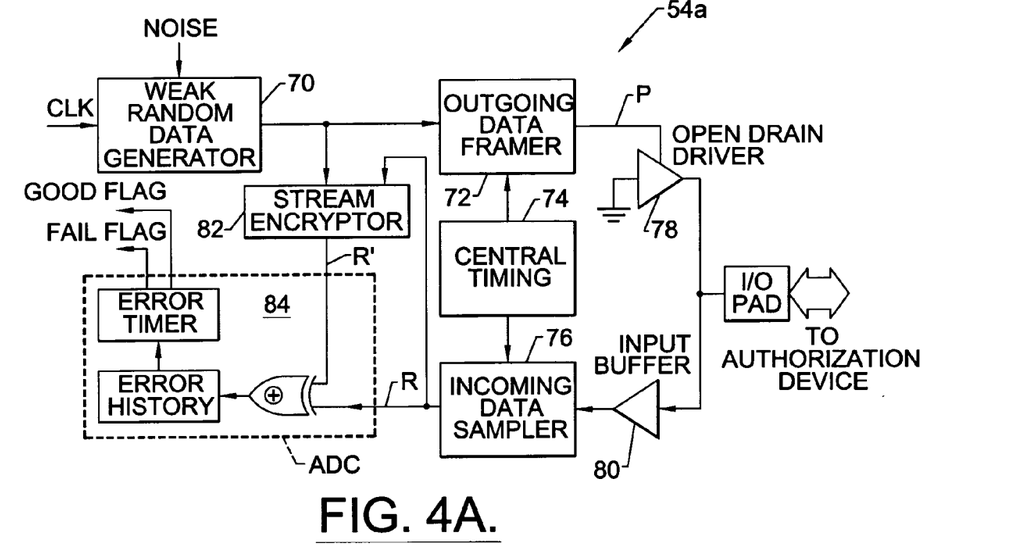
FIG. 4A is a block electrical schematic of preferred deadman circuitry within a PLD or ASIC according to the present invention.
Figure 4B:
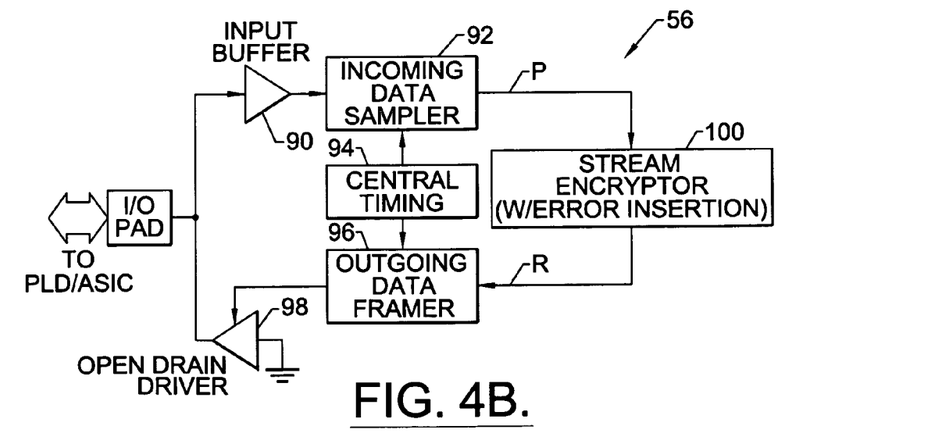
FIG. 4B is a block electrical schematic of a preferred authorization device according to the present invention.

Referring now to FIGS. 4A–4B, a more detailed description of the operation of the integrated systems of FIGS. 3A–3C will be provided. These systems include devices that authorize operation of programmable and other logic devices that operate under at least partial control of proprietary software and/or hardware. With respect to the programmable logic devices 54 illustrated by FIG. 3A, the authorization device 56 preferably provides continuous authorization to a respective programmable logic device 54 while it is operating in a desired target application. This continuous authorization is preferably provided only so long as the binary configuration data ("software") being used by the programmable logic device 54 matches the version of software the authorization device 56 was designed to evaluate and approve.

According to the preferred deadman circuitry 54a of FIG. 4A, which is also referred to herein as a type of dead man switch, a first data stream P may be generated by a weak random data generator 70. As illustrated, the weak random data generator 70 may provide a weak random data stream in response to a clock signal and a noise signal and may be of conventional design. An outgoing data framer 72 and an open-drain driver 78 may also be provided so that the first data stream P can be passed to an input/output pad (I/O). This first data stream P may be provided in-sync with timing signals generated by a central timing circuit 74. Other formats for the first data stream P may also be used.

Referring now to the preferred authorization device 56 of FIG. 4B, a second encrypted data stream R is generated and provided by a respective stream encryptor 100 to the input/ output pad (I/O). This second encrypted data stream R is preferably provided in response to the first data stream P. The illustrated I/O pads associated with the authorization device 56 of FIG. 4B and the deadman circuitry 54a of FIG. 4A may be connected together by a single-wire bus. A two-wire bus can also be used and such configuration may eliminate the need to provide open-drain drivers. Alternatively, a three-wire bus can be used with an additional clock and such implementation may eliminate the need for timing/framing pulses. If a single-wire bus is used to provide an electrical connection, then the second encrypted data stream R may be time-division multiplexed with the first data stream P on the single-wire bus using a half-duplex format. Operations for multiplexing data in a single-wire bus are generally known to those skilled in the art and need not be described further herein. The illustrated authorization device 56 may comprise an input buffer 90 and an incoming data sampler 92 that operates in response to a central timing circuit 94. Using these conventional devices, the first data stream P can be retrieved from the I/O pad and provided to an input of the stream encryptor 100. As described more fully hereinbelow, the stream encryptor 100 of FIG. 4B generates the second encrypted data stream R (with error) using an encryption operation. This encrypted data stream R is then framed and provided to an I/O pad using conventional devices such as the illustrated outgoing data framer 96 and open drain driver 98. To increase security and to inhibit the likelihood that the construction of the authorization device 56 can be readily reverse-engineered, circuitry within the illustrated stream encryptor 100 may be designed to randomly insert errors into the second encrypted data stream R. The presence of a limited number of intentional errors will typically increase the difficulty in determining the encryption operation by evaluating the data on the single-wire bus using conventional reverse engineering techniques. If protection against reverse-engineering is not required, then the data streams need not be encrypted.

Referring again to the deadman circuitry 54a of FIG. 4A, an input buffer 80 receives the time-division multiplexed stream (e.g., half-duplex stream) and passes the received stream to an incoming data sampler 76. In response to central timing, this data sampler 76 extracts the second encrypted data stream R from the multiplexed stream and provides it to an authorization detection circuit (ADC) 84. As illustrated, the ADC 84 may comprise an exclusive OR (XOR) gate, an error history evaluation circuit and an error timer. The deadman circuitry 54a may also comprise a stream encryptor 82 that generates and provides a third encrypted data stream R' to an input of the XOR gate within the ADC 84, in response to the first data stream P and the second encrypted data stream R (with error). To reduce the complexity of the ADC 84, the stream encryptor 82 within the deadman circuitry 54a preferably performs operations similar to the stream encryptor 100 within the authorization device 56, but typically need not perform error insertion operations. This third encrypted data stream R' is preferably generated within the deadman circuitry 54a (under control of the configuration data compiled from the deadman source code) while other portions of the PLD 54 simultaneously operate under at least partial control of the configuration data compiled from the design source code.

According to a preferred aspect of the ADC 84, a logic 1 error signal is generated at an output of the XOR gate every time a mismatch between the second and third encrypted data streams is detected. A running history of these error signals is then maintained by the error history circuit. If an insufficient number of errors are detected within a predetermined threshold time period, for example, then a "good" flag may be generated by the ADC 84 to enable proper operation of the PLD 54 for at least some limited time period. Because of the presence of intentional errors in the second encrypted data stream R, an exact identity between the encrypted data streams is preferably not be required by the ADC 84 in order to maintain the status of the good flag. However, if a sufficiently close identity is not present between the encrypted data streams over a threshold period of time, then a "fail" flag may be generated. The generation of this fail flag preferably causes the PLD 54 to enter a disabled state. In this disabled state, the PLD 54 may cease to operate or may operate at a degraded performance level caused by the intentional internal generation of operating errors (e.g., "random" operating errors) by circuitry within the PLD 54. Other degraded performance states may also be possible.

Figure 4C:
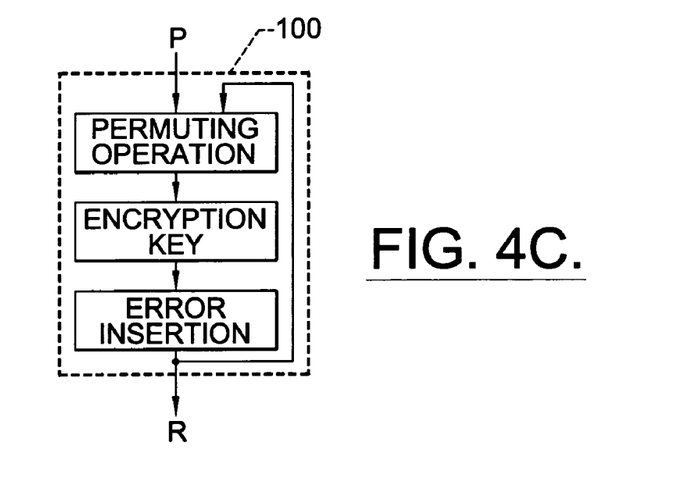
FIG. 4C is a block diagram illustrating operations performed by the stream encryptor of FIG. 4B.

Referring now to FIGS. 4A–4C, encryption operations performed by the deadman circuitry 54a and the authorization device 56 will be more fully described. As described above with respect to the weak random data generator 70 in FIG. 4A, a first data stream P may be generated by mixing noise and clock signals. This mixing operation may be performed using conventional techniques using an "unpredictable" circuit that sequentially generates a weak pseudo-random stream of bit data as $\{P_1, P_2, P_3, \ldots, P_n\}$, where "n" is an integer. This first data stream P is then provided to a first stream encryptor 82 within the configured deadman circuitry 54a and also to the authorization device 56. The authorization device 56 is preferably configured to respond to the first data stream P by generating a second encrypted data stream R of bit data as $\{R_1, R_2, R_3, \ldots, R_n\}$. This second encrypted data stream R is then fed back, potentially with a limited number of intentional and randomly inserted errors therein, to the deadman circuitry 54a within the PLD 54. The second encrypted data stream R may be time division multiplexed (e.g., interleaved) with the first data stream P. Thus, the bit data on the single-wire bus connecting the authorization device 56 to the PLD 54 may look like: $\{P_1, R_1, P_2, R_2, P_3, R_3, \ldots, P_n, R_n\}$.

The second encrypted data stream R is preferably generated by performing an encryption operation that evaluates the first data stream P and a plurality of previously generated bits in the second encrypted data stream R. As illustrated by the flow diagram of operations shown in FIG. 4C, the second stream encryptor 100 within the authorization device 56 may use conventional permuting operations to sequentially determine a plurality of permuted bits as $\{H_1, H_2, H_3, \ldots, H_n\}$ during a first time interval, with each permuted bit being determined in accordance with the following expression:

$$H_i = f_p(P_i, R_{i-j}, \ldots R_{i-j-k})$$

where $f_p$ is a permuting function, "i" and "j" are positive integers and "k" represents a preferred "depth" to which the first data stream R is evaluated. Accordingly, each of these permuted bits $H_1, H_2, \ldots, H_n$ is generated at a respective point in the first time interval. The second stream encryptor 100 within the authorization device 56 may also use a conventional encryption key ($f_{key}$) to generate the second encrypted data stream from the permuted bits in accordance with the following expression:

$$R_{i+1} = f_{key}(H_i, H_{i-l}, \ldots H_{i-l-m})$$

where "l" and "m" are positive integers. Other conventional permuting operations and encryption keys may also be used and those described herein are provided as exemplary operations for generating an encrypted data stream.

To increase security and to inhibit the likelihood that the construction of the authorization device can be readily reverse-engineered, error insertion circuitry may be incorporated within the second stream encryptor 100 to intentionally insert "random" errors into the second encrypted data stream R. The presence of a limited number of intentional errors will typically increase the difficulty in reverse engineering the encryption operation by evaluating the data on the single-wire bus.

The first stream encryptor 82 within the deadman circuitry 54a also preferably performs encryption operations to generate a third encrypted data stream R' from the first data stream P and the second encrypted data stream R (with errors). In particular, the exemplary permuting and encryption key operations performed by the first stream encryptor 82 are preferably the same as the corresponding operations performed by the second stream encryptor 100 within the authorization device 56. However, different operations may also be used by the stream encryptors in less preferred embodiments and the associated authorization detection circuitry may be considerably more complex.

The second and third encrypted data streams R and R' are evaluated at least periodically during the first time interval to determine whether a "match" is present between the authorization device 56 and the proprietary "software" loaded into the PLD 54. This evaluation is preferably performed by the authorization detection circuitry ADC 84 within the PLD 54. Thus, a direct ongoing comparison can be made between the encrypted data streams to determine whether there is a sufficiently close identity therebetween, while the PLD 54 is running the proprietary software.

Figure 5:
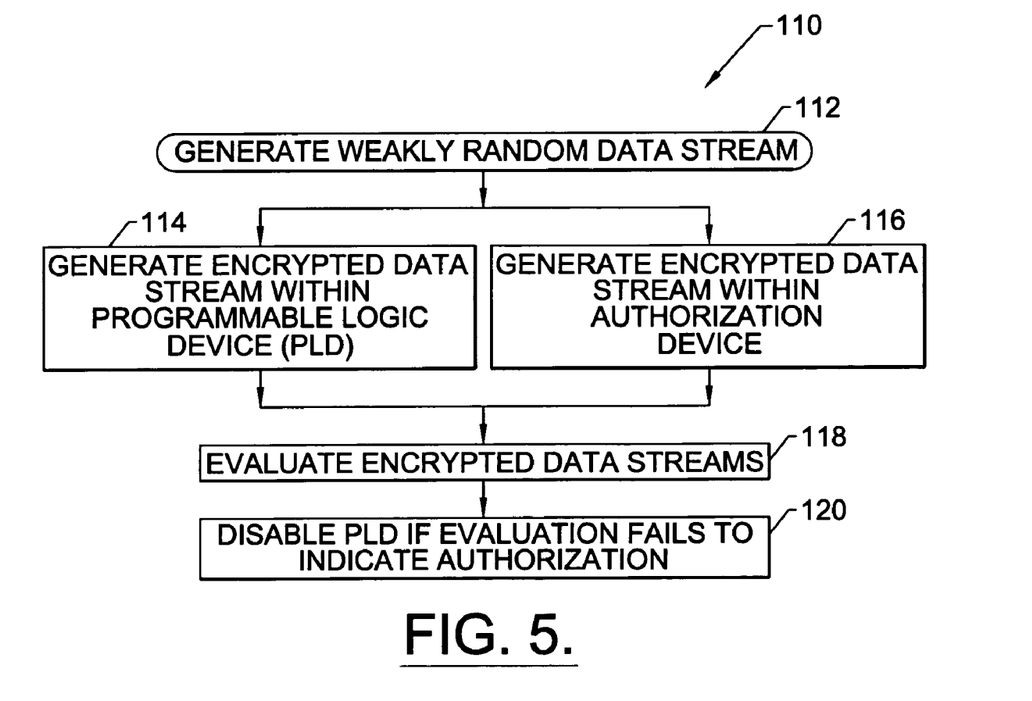
FIG. 5 is a flow diagram of operations that illustrate preferred methods of operating programmable logic devices according to the present invention.

Accordingly, as illustrated by FIG. 5, exemplary operations 110 for authorizing operation of a programmable logic device (PLD) may include operations to generate an at least weakly random data stream, Block 112, and then generate first and second encrypted data streams within the PLD and authorization device, Blocks 114 and 116. These encrypted data streams 118 are then evaluated, Block 118. Exemplary evaluation operations may include a bit-by-bit comparison between the first and second encrypted data streams to determine if a sufficiently close match is present. Then, as illustrated by Block 120, the PLD is disabled if the evaluation operation fails to indicate authorization of the PLD by the authorization device.

The above-described authorization scheme may also be applied to other forms of programmable logic devices (PLDs). Some of these programmable logics devices are frequently referred to by the acronyms PLAs, PALs, FPLAs, EPLDs, EEPLDS, LCAs, and FPGAs. In addition, the preferred authorization scheme may be applied to application-specific integrated circuits (ASICs) that perform operations which are exclusively or at least partially hardware based. For example, the ASIC 58 of FIGS. 3B and 3C may be designed to perform a plurality of functions and operations useful for a variety of target applications. Customers purchasing such ASICs may be able to upgrade or expand the functions and operations performed by the ASIC 58 by purchasing one or more authorization devices at the time the ASIC 58 is purchased or thereafter. According to one embodiment applicable to ASICs, each of these additional authorization devices 56b, 56c can be connected to respective pins of the ASIC 58 to enable the ASIC 58 to perform additional or replacement functions and operations that correspond to the particular authorization device or combination of authorization devices. Alternatively, multiple authorization devices could be configured to share a common bus line, and in this case the respective ASIC 58 could be designed to have a set of chip selects for a plurality of authorization devices. The protocol could also be extended to deal with multiple authorization devices sharing a common bus line without individual selects.

Thus, an additional embodiment of the present invention may include first and second integrated circuit devices that generate first and second data streams, respectively, while the first integrated circuit device (e.g., ASIC, PLD) performs software and/or hardware controlled operations. This first integrated circuit device preferably has authorization detection circuitry therein that receives and at least periodically evaluates the first and second data streams and disables the software and/or hardware controlled operations when the first and second data streams fail to indicate a sufficient match between the second integrated circuit device (e.g., authorization device) and the software and/or hardware controlled operations performed by the first integrated circuit device. Still further embodiments of the present invention may include "slave" PLDs (or slave ASICs) that monitor the single-wire bus between a master PLD (or master ASIC) and a respective authorization device. Each slave device may listen to the data provided on the single-wire bus to determine whether authorization is occurring. This determination may be made by incorporating into each slave device deadman circuitry that is similar to the circuitry within a corresponding master device. A slave device need not have circuitry to enable it to generate the first data stream P on the single-wire bus, however, additional circuitry may be necessary to enable it to operate in-sync with the communications between the master device and the authorization device.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. An authorization device, comprising:
an integrated circuit component responsive to a first data stream that is time-varying during a first time interval, said integrated circuit component configured to perform an encryption operation on at least a portion of the first data stream to thereby generate a second encrypted data stream that is time-varying and at least periodically evaluated during the first time interval to assess whether operation of a programmable logic device is authorized during the first time interval;
wherein the encryption operation generates a first permuted bit as a function of a first bit in the first data stream and at least a first encrypted bit in the second encrypted data stream; and
wherein the encryption operation uses an encryption key to generate a second encrypted bit in the second encrypted data stream from at least the first permuted bit.

2. The authorization device of claim 1, wherein the encryption operation generates a second permuted bit as a function of a second bit in the first data stream and at least the second encrypted bit in the second encrypted data stream.

3. The authorization device of claim 2, wherein the encryption operation uses the encryption key to generate a third encrypted bit in the second encrypted data stream from the second permuted bit and the first permuted bit.

4. An authorization device, comprising:
an integrated circuit component responsive to a first data stream that varies in time during a first time interval, said integrated circuit component configured to perform an encryption operation on at least a portion of the first data stream to thereby generate a second encrypted data stream that is time-varying and at least periodically evaluated during the first time interval to assess whether operation of a programmable logic device is authorized during the first time interval;
wherein said integrated circuit component comprises circuitry that intentionally inserts errors into the second encrypted data stream in sufficient quantity to inhibit reverse-engineering of the encryption operation; and
wherein the encryption operation generates a first permuted bit as a function of a first bit in the first data stream and at least a first encrypted bit in the second encrypted data stream.

5. The authorization device of claim 4, wherein the encryption operation uses an encryption key to generate a second encrypted bit in the second encrypted data stream from at least the first permuted bit.

6. An authorization device, comprising:
an integrated circuit component that in response to a first data stream generates a second encrypted data stream which is at least periodically evaluated during a first time interval to assess whether operation of a programmable logic device during the first time interval is authorized;
wherein the first data stream and the second encrypted data stream are time division multiplexed on an I/O pin associated with said integrated circuit component;
wherein said integrated circuit component utilizes an encryption operation to generate the second encrypted data stream from the first data stream;
wherein the encryption operation generates a first permuted bit as a function of a first bit in the first data stream and at least a first encrypted bit in the second encrypted data stream; and
wherein the encryption operation uses an encryption key to generate a second encrypted bit in the second encrypted data stream from at least the first permuted bit.

7. An integrated system, comprising:
an authorization device configured to generate a first encrypted data stream that is time-varying during a first time interval;
a programmable logic device configured to generate a second encrypted data stream, which is time-varying during the first time interval, while simultaneously operating under at least partial control of configuration data during the first time interval; and
authorization detection circuitry configured to at least periodically compare the first and second encrypted data streams at multiple points during the first time interval and further configured to disable operation of said programmable logic device if the first and second encrypted data streams indicate that said programmable logic device is not authorized to utilize the configuration data during the first time interval.

8. The system of claim 7, wherein said programmable logic device generates an at least weakly random data stream during the first time interval; and wherein said authorization device generates the first encrypted data stream in response to the at least weakly random data stream.

9. The system of claim 7, wherein said authorization detection circuitry is internal to said programmable logic device; wherein said programmable logic device utilizes an encryption operation to generate the second encrypted data stream; and wherein each of a plurality of bits in the second encrypted data stream is determined by evaluating at least one bit in the first encrypted data stream.

10. An integrated system, comprising:
an authorization device configured to generate a first encrypted data stream that is time-varying during a first time interval;
a programmable logic device configured to generate a second encrypted data stream, which is time-varying during the first time interval, while simultaneously operating under at least partial control of configuration data during the first time interval; and
authorization detection circuitry configured to at least periodically compare the first and second encrypted data streams at multiple points during the first time interval and further configured to disable operation of said programmable logic device if the first and second encrypted data streams indicate that said programmable logic device is not authorized to utilize the configuration data during the first time interval;
wherein said programmable logic device generates an at least weakly random data stream during the first time interval;
wherein said authorization device generates the first encrypted data stream in response to the at least weakly random data stream;
wherein said authorization detection circuitry operates as a dead man switch internal to said programmable logic device;
wherein said programmable logic device utilizes an encryption operation to generate the second encrypted data stream; and
wherein each of a plurality of bits in the second encrypted data stream is determined by performing the encryption operation on at least one respective bit in the first encrypted data stream and at least one respective bit in the at least weakly random data stream.

11. The system of claim 10, wherein each of the plurality of bits in the second encrypted data stream is determined at a respective point in the first time interval by performing the encryption operation on at least one bit in the first encrypted data stream generated at an earlier point in the time interval and at least one bit in the at least weakly random data stream.

12. An integrated system, comprising:
an authorization device configured to generate a first time-varying encrypted data stream during a first time interval;
an integrated circuit device configured to generate a second time-varying encrypted data stream and perform first operations during the first time interval; and
authorization detection circuitry that at least periodically compares the first and second time-varying encrypted data streams at multiple points during the first time interval and disables operation of said integrated circuit device if the first and second time-varying encrypted data streams indicate that said integrated circuit device is not authorized to perform the first operations.

13. The system of claim 12, wherein said integrated circuit device generates an at least weakly random data stream during the first time interval; and wherein said authorization device generates the first time-varying encrypted data stream in response to the at least weakly random data stream.

14. The system of claim 12, wherein said authorization detection circuitry is internal to said integrated circuit device; wherein said integrated circuit device utilizes an encryption operation to generate the second time-varying encrypted data stream; and wherein each of a plurality of bits in the second time-varying encrypted data stream is determined by evaluating at least one bit in the first time-varying encrypted data stream.

15. The system of claim 13, wherein said authorization device and said integrated circuit device are electrically connected together by a bus; and wherein the at least weakly random data stream is time division multiplexed on the bus with the first time-varying encrypted data stream.

16. An integrated system, comprising:
an authorization device configured to generate a first time-varying encrypted data stream during a first time interval;
an integrated circuit device configured to generate a second time-varying encrypted data stream and perform first operations during the first time interval; and
authorization detection circuitry that at least periodically compares the first and second time-varying encrypted data streams at multiple points during the first time interval and disables operation of said integrated circuit device if the first and second time-varying encrypted data streams indicate that said integrated circuit device is not authorized to perform the first operations;
wherein said integrated circuit device generates an at least weakly random data stream during the first time interval;
wherein said authorization device generates the first time-varying encrypted data stream in response to the at least weakly random data stream;
wherein said authorization detection circuitry operates as a dead man switch internal to said integrated circuit device;
wherein said integrated circuit device utilizes an encryption operation to generate the second time-varying encrypted data stream; and
wherein each of a plurality of bits in the second time-varying encrypted data stream is determined by performing the encryption operation on at least one respective bit in the first time-varying encrypted data stream and at least one respective bit in the at least weakly random data stream.

17. A method of operating a programmable logic device, comprising the steps of:
generating first and second time-varying encrypted data streams in first and second devices, respectively, during a first time interval while simultaneously operating the programmable logic device configured to perform a first operation during the first time interval; and
evaluating the first and second time-varying encrypted data streams at least periodically during the first time interval and disabling operation of the programmable logic device during a subsequent second time interval if a comparison of the first and second time-varying encrypted data streams indicate that the programmable logic device is not authorized to perform the first operation during the first time interval.

18. The method of claim 17, further comprising the step of generating an at least weakly random data stream during the first time interval; and wherein the first and second time-varying encrypted data streams are generated from the at least weakly random data stream.

19. The method of claim 18, wherein the first time-varying encrypted data stream is generated internal to the programmable logic device and the second time-varying encrypted data stream is generated external to the programmable logic device.

20. A method of operating a programmable logic device, comprising the steps of:
generating first and second encrypted data streams in first and second devices, respectively, while simultaneously operating the programmable logic device configured to perform a first operation during a first time interval;
evaluating the first and second encrypted data streams at least periodically during the first time interval and disabling operation of the programmable logic device during a subsequent second time interval if a comparison of the first and second data streams indicate that the programmable logic device is not authorized to perform the first operation; and
generating an at least weakly random data stream during the first time interval;
wherein the first and second encrypted data streams are generated from the at least weakly random data stream;
wherein the first encrypted data stream is generated internal to the programmable logic device and the second encrypted data stream is generated external to the programmable logic device;
wherein the at least weakly random data stream is generated internal to the programmable logic device;
wherein the at least weakly random data stream is provided by a single wire bus to a device external to the programmable logic device; and
wherein the at least weakly random data stream is time division multiplexed on the bus with the second encrypted data stream.

21. The method of claim 20, wherein the at least weakly random data stream is generated by mixing clock and noise signals.

22. The method of claim 20, wherein each of a plurality of bits in the first encrypted data stream is evaluated by performing an encryption operation on a respective bit in the at least weakly random data stream and a respective plurality of bits in second encrypted data stream.

23. An authorization device, comprising:
a first integrated circuit component that in response to a first data stream generated external to said first component generates a second data stream that is at least periodically evaluated by a distinct second integrated circuit component to assess whether performance of operations within the second integrated circuit component are authorized during a time interval when the first data stream is being generated;
wherein the second data stream is an encrypted data stream; and
wherein each of a plurality of bits within the second data stream is generated within said first integrated circuit component using an encryption operation that is a function of at least one bit in the first data stream and at least one bit in the second data stream.

24. An authorization device, comprising:
a first integrated circuit component that in response to a first data stream generated external to said first component generates a second data stream that is at least periodically evaluated by a distinct second integrated circuit component to assess whether performance of operations within the second integrated circuit component are authorized during a time interval when the first data stream is being generated;
wherein the second data stream is an encrypted data stream; and wherein a first encrypted bit within the second data stream is generated within said first integrated circuit component using an encryption operation that is a function of at least one bit in the first data stream and a plurality of previously generated encrypted bits in the second data stream.

25. The device of claim 24, wherein said first integrated circuit component comprises circuitry that intentionally inserts random errors into the second encrypted data stream.

26. An integrated circuit system, comprising:
a first component that in response to a first time-varying data stream generated external to said first component generates a second time-varying encrypted data stream; and
a second component that generates the first time-varying data stream provided to said first component and at least periodically evaluates the second time-varying encrypted data stream received by said second component to assess whether performance of at least one operation within the second component is authorized during a time interval when the first time-varying data stream and the second time-varying encrypted data stream are being generated.

27. The system of claim 26, wherein said second component comprises an integrated circuit selected from a group consisting of ASICs and PLDs.

28. The system of claim 26, wherein said second component generates the first time-varying data stream; and wherein said first and second components comprise first and second stream encryptors therein, respectively.

29. The system of claim 26, wherein said first and second components are electrically connected together by a single wire bus; and wherein the first time-varying data stream and the second time-varying encrypted data stream are time division multiplexed on the single wire bus.

30. The system of claim 28, wherein said first and second components are electrically connected together by a single wire bus; and wherein the first time-varying data stream and the second time-varying encrypted data stream are time division multiplexed on the single wire bus.

31. The system of claim 30, wherein said first component comprises circuitry that intentionally inserts random errors into the second time-varying encrypted data stream in sufficient quantity to inhibit reverse-engineering of an encryption operation used to generate the second time-varying encrypted data stream.

32. An integrated circuit system, comprising:
a first component that in response to a first data stream generated external to said first component generates a second encrypted data stream; and
a second component that at least periodically evaluates the second encrypted data stream to assess whether performance of at least one operation within the second component is authorized during a time interval when the first data stream is being generated;
wherein said second component generates the first data stream;
wherein said first and second components comprise first and second stream encryptors therein, respectively;
wherein the second encryptor within said second component generates a third encrypted data stream; and
wherein said second component comprises circuitry that operates as a deadman switch to disable performance of the at least one operation within said second component if the second and third encrypted data streams fail to indicate that said second component is authorized by said first component to perform the at least one operation.

33. An integrated circuit system, comprising:
first and second integrated circuit devices that generate first and second time-varying data streams, respectively, while said first integrated circuit device performs software and/or hardware controlled operations during a time interval, said first integrated circuit device having authorization detection circuitry therein that receives and at least periodically evaluates the first and second time-varying data streams at multiple points during the time interval and disables the software and/or hardware controlled operations when the first and second time-varying data streams fail to indicate a sufficient match between said second integrated circuit device and the software and/or hardware controlled operations performed by said first integrated circuit device during the time interval.

34. The system of claim 33, wherein said first and second integrated circuit devices generate the first and second time-varying data streams in response to an at least weakly random sequence of bits.

35. The system of claim 34, wherein said first and second integrated circuit devices are electrically coupled together by a single wire bus; and wherein the at least weakly random sequence of bits and the second time-varying data stream are time division multiplexed on the single wire bus.

36. The system of claim 35, wherein said first integrated circuit device comprises a first stream encryptor that generates the first time-varying data stream as a first encrypted data stream from the at least weakly random sequence of bits; and wherein said second integrated circuit device comprises a second stream encryptor that generates the second time-varying data stream as a second encrypted data stream from the at least weakly random sequence of bits.

37. The system of claim 34, wherein said first integrated circuit device generates the at least weakly random sequence of bits and comprises a first stream encryptor that generates the first time-varying data stream as a first encrypted data stream from the at least weakly random sequence of bits and the second time-varying data stream; and wherein said second integrated circuit device comprises a second stream encryptor that generates the second time-varying data stream as a second encrypted data stream from the at least weakly random sequence of bits.

38. An integrated circuit system, comprising:
first and second integrated circuit devices that generate first and second encrypted data streams, respectively, while said first integrated circuit device performs software and/or hardware controlled operations, said first integrated circuit device having authorization detection circuitry therein that receives and at least periodically evaluates the first and second encrypted data streams and disables the software and/or hardware controlled operations when the first and second encrypted data streams fail to indicate a sufficient match between said second integrated circuit device and the software and/or hardware controlled operations performed by said first integrated circuit device;
wherein said first integrated circuit device comprises authorization detection circuitry that generates an error history from the first and second encrypted data streams.

39. The system of claim 38, wherein said second integrated circuit device comprises circuitry that intentionally inserts random errors into the second encrypted data stream.

* * * * *